United States Patent [19]
Watanabe et al.

[11] Patent Number: 5,430,852
[45] Date of Patent: Jul. 4, 1995

[54] CONTROL TRANSFER METHOD IN SYSTEM WITH MULTIPLE ARITHMETIC UNITS EACH WITH INDEPENDENT MICROPROGRAM CONTROL BY TRANSFERRING START ADDRESS AND BRANCH CONDITION CODES

[75] Inventors: Shinji Watanabe, Tokyo; Hirokazu Ishizaka, Yamanashi, both of Japan

[73] Assignee: NEC Corporation, Tokyo, Japan

[21] Appl. No.: 31,941

[22] Filed: Mar. 16, 1993

[30] Foreign Application Priority Data

Mar. 16, 1992 [JP] Japan .................... 4-055865

[51] Int. Cl.⁶ .................. G06F 9/26; G06F 15/16
[52] U.S. Cl. ............................ 395/375; 364/230;
364/245.7; 364/258; 364/261.5; 364/262.8;
364/265; 364/736.5; 364/737; 364/741;
364/DIG. 1; 364/DIG. 2; 395/200; 395/800
[58] Field of Search ............... 364/736.5, 737, 741;
371/40.2; 395/200, 375, 500, 800

[56] References Cited

U.S. PATENT DOCUMENTS

| | | | |
|---|---|---|---|
| 4,438,488 | 3/1984 | Shibayama et al. | 395/800 |
| 4,519,077 | 5/1985 | Amin | 371/21 |
| 4,566,103 | 1/1986 | Sato et al. | 371/12 |
| 4,642,757 | 2/1987 | Sakamoto | 395/550 |
| 4,789,957 | 12/1988 | Niehaus et al. | 364/749 |
| 4,800,563 | 1/1989 | Itagaki et al. | 371/13 |
| 4,821,187 | 4/1989 | Ueda et al. | 395/375 |
| 4,887,203 | 12/1989 | MacGregor et al. | 395/375 |
| 4,989,172 | 1/1991 | Criswell | 364/737 |
| 5,056,015 | 10/1991 | Baldwin et al. | 395/500 |
| 5,241,637 | 8/1993 | Skruhak et al. | 395/375 |

*Primary Examiner*—Ken S. Kim
*Attorney, Agent, or Firm*—Sughrue, Mion, Zinn, Macpeak & Seas

[57] ABSTRACT

A microprogram control system has first and second microprogram control units and first and second arithmetic circuits corresponding to the first and second microprogram control units, respectively. The first unit has a first control memory holding microinstructions for controlling the first arithmetic circuit and a first condition register for storing status information given as a branch condition from the first arithmetic circuit. The second unit is made up of corresponding structure. In response to a start microinstruction read out from the first control memory, the first unit stores a start command and a start address in the start microinstruction into a command register and a start address register therein, respectively, and sends the start command, the start address and the status information to the second control unit. In response to the start command, the second unit stores the status information given from the first condition register into its condition register and reads out a microinstruction from its control memory based on the start address given from the start address register.

11 Claims, 2 Drawing Sheets

CONTROL TRANSFER METHOD IN SYSTEM WITH MULTIPLE ARITHMETIC UNITS EACH WITH INDEPENDENT MICROPROGRAM CONTROL BY TRANSFERRING START ADDRESS AND BRANCH CONDITION CODES

BACKGROUND OF THE INVENTION

The invention relates to a microprogram control system.

Information processing systems have recently been adopting an arrangement in which a plurality of arithmetic circuits each performing a different type of arithmetic operation are arranged near the corresponding microprogram control units holding microprograms for controlling the arithmetic circuits. This is because the time which a signal takes to travel from a microprogram control unit to the corresponding arithmetic circuit can be reduced by placing the microprogram control unit adjacent to the arithmetic circuit. In this arrangement, a case takes place in which a microprogram control unit (I) in operation needs to have an arithmetic operation performed which its associated arithmetic circuit cannot perform, and therefore the unit (I) requests another microprogram control unit (II) at rest to take over its processing. In this case, in the unit (II) the status information, stored in the conditional register of the unit (I), from the arithmetic circuit controlled by the unit (I) becomes necessary when a conditional branch microinstruction which determines a branch address on the basis of the status information is read out of the unit (II). In prior art systems, such status information from the arithmetic circuits is stored, under the control of extra microinstructions, in an extra common memory which can be accessed by a plurality of microprogram control units.

Further, when a single-bit error is detected, for example, by a parity check technique, in a microinstruction stored in the unit (I) for starting the unit (II), such microinstruction including a start command and a start address, the start command or the start address may be incorrect. In this case, the unit (I) sends a cancel signal to a dedicated cancel circuit located adjacent to the arithmetic circuit associated with the unit (II), to cancel the start command and the start address sent to the unit (II). In response to the cancel signal, the cancel circuit sets the bit pattern of the microinstruction to be supplied to the arithmetic circuit from the unit (II) forcibly to all zeros. In this prior art system, such a cancel circuit must be provided near each arithmetic circuit.

SUMMARY OF THE INVENTION

One object of the invention is therefore to provide a microprogram control system which does not require an extra memory for status information storage.

Another object of the invention is to provide a microprogram control system which does not require an individual cancel circuit for each microprogram control unit for microinstruction cancellation.

According to an aspect of the invention, there is provided a microprogram control system comprising a plurality of microprogram control units and a plurality of arithmetic circuits each of which corresponds to one of the microprogram control units.

Each of the microprogram control units comprises a control memory holding microinstructions for controlling a corresponding arithmetic circuit, a read register for storing a microinstruction read out of the control memory, a command register for storing a start command included in a microinstruction in the read register and a start address register for storing a start address included in a microinstruction in the read register. The start command is for starting at least one of the other microprogram control units. The start address is sent to the at least one of the other microprogram control units together with said start command. Each microprogram control unit further comprises a condition register for storing status information given from the corresponding arithmetic circuit as a branch condition, addressing means for determining a read address to next be supplied to the control memory, with reference to the status information in the condition register, if a conditional branch microinstruction is stored in the read register, and start means responsive to another start command given from another command register in another microprogram control unit for storing another status information given from another condition register of the another microprogram control unit into the condition register and for reading out a microinstruction from the control memory on the basis of another start address given from another start address register in the another microprogram control unit.

According to another aspect of the invention, there is provided a microprogram control system comprising a plurality of microprogram control units and a plurality of arithmetic circuits each of which corresponds to one of the microprogram control units.

Each microprogram control unit comprises a control memory holding microinstructions for controlling a corresponding arithmetic circuit, a read register for storing a microinstruction read out of the control memory, a command register for storing a start command included in a microinstruction in the read register, and a start address register for storing a start address included in a microinstruction in the read register. The start address is for reading out a microinstruction from the at least one of the other microprogram control units. Each microprogram control unit further comprises a condition register for storing status information given from the corresponding arithmetic circuit which information is used as a branch condition when a conditional branch microinstruction is stored in said read register, and start means responsive to a start microinstruction stored in the read register from the control memory for storing the start command and the start address included in the start microinstruction into the command register and the start address register, respectively, and for sending the start command, the start address and the status information to the at least one of the other microprogram control units.

BRIEF DESCRIPTION OF THE DRAWINGS

Other features and advantages will become apparent from the following detailed description when taken in conjunction with the accompanying drawings, in which.

In the drawings, the same reference numerals represent the same structural elements.

DETAILED DESCRIPTION OF THE PREFERRED EMBODIMENTS OF THE INVENTION

Description will next be made on preferred embodiments of the invention in detail.

Figure 1:
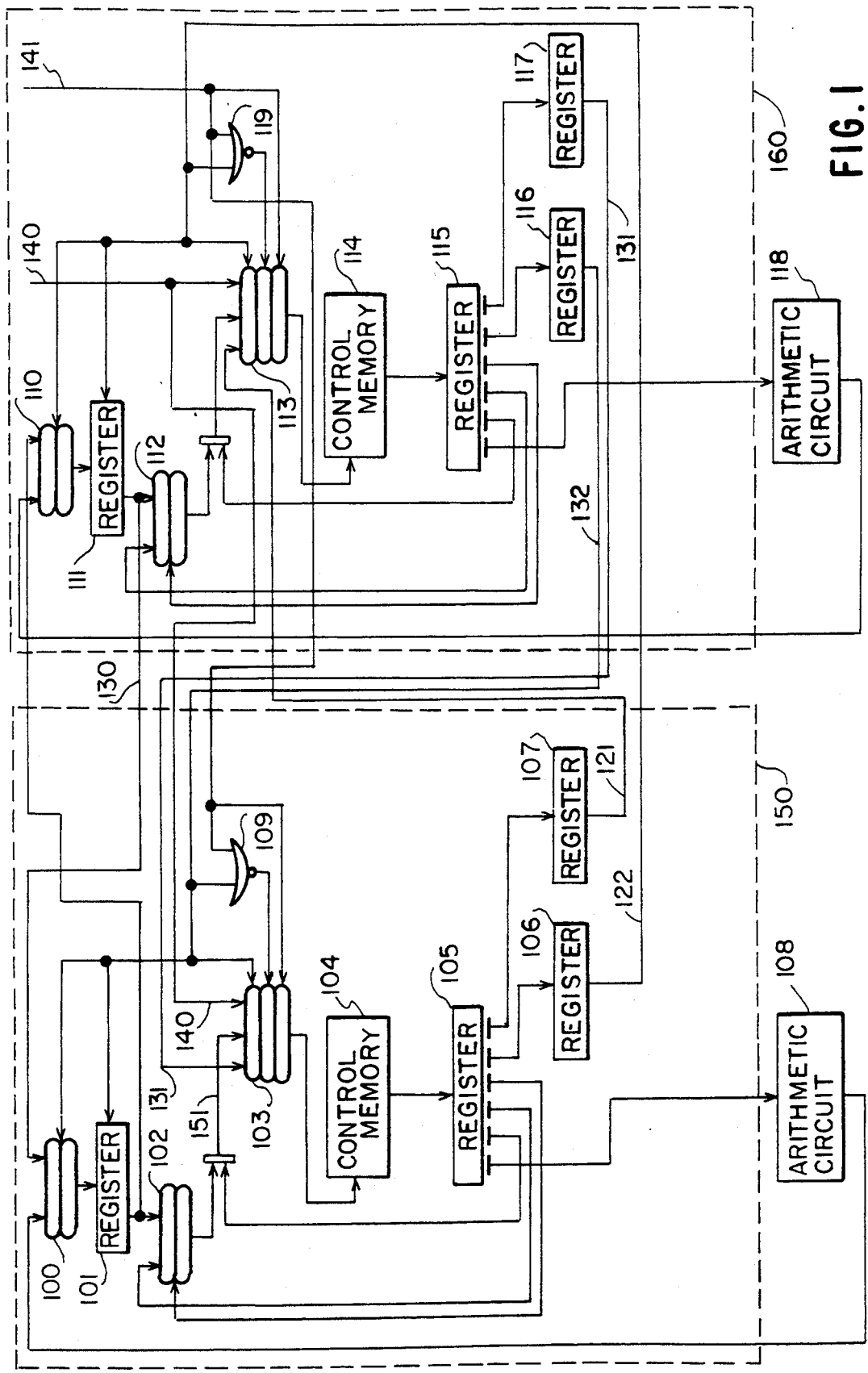
FIG. 1 is a block diagram of a first embodiment of the invention.

Referring to FIG. 1, a first embodiment of the invention comprises microprogram control units 150 and 160 which microprogram-control arithmetic circuits 108 and 118, respectively.

The unit 150 comprises a control memory 104 holding microprograms consisting of microinstructions for controlling the arithmetic circuit 108, a read register 105 for storing a microinstruction read out of the memory 104, a command register 106 for storing a start command, a address register 107 for storing a start address, a condition register 101 for storing a branch condition, selectors 100, 102 and 103, and a NOR gate 109.

The unit 160 comprises a control memory 114 holding microprograms consisting of microinstructions for controlling the arithmetic circuit 118, a read register 115 for storing a microinstruction read out of the memory 114, a command register 116 for storing a start command, a address register 117 for storing a start address, a condition register 111 for storing a branch condition, selectors 110, 112 and 113, and a NOR gate 119.

The microinstructions typically include a control field for controlling the arithmetic circuit 108 or 118 to perform a certain function, a first address field, a second address field, a third address field and a command field. The control field specifies various operations, for example, a branch operation. The first and second address fields contain the address where control is to be transferred during an unconditional branch operation. The second address field contains bits which are replaced by bits output from the condition register during a conditional branch operation. The third address field is used to hold a start address where a microinstruction is located in the control memory of another microprogram control unit which is to take over the operation processing from the present microprogram control unit holding the microinstruction having the third address field. The command field is used to hold a start command for instructing another microprogram control unit to take over processing.

In the unit 150, the start command stored in the command register 106 is for making the unit 160 come into operation. The start address in the address register 107 indicates a storage location in the control memory 114 of the unit 160 at which is stored a microinstruction to be read out at the time the unit 160 is started by the start command stored in the register 106. As the branch condition to be stored in the condition register 101, the selector 100 selects status information stored in the condition register 111 through a line 130 if a start command is given from the command register 116 in the unit 160 through a line 132 to transfer control from the unit 160 to the unit 150. Otherwise, the selector 108 selects status information given from the arithmetic circuit 108. The selector 102 selects an output from register 101 if the control field of a microinstruction stored in the read register 105 indicates a conditional branch operation, and otherwise selects the second address field of the microinstruction stored in the read register 105. As a read address to be supplied to the memory 104, the selector 103 selects an address supplied from a central control unit (not shown) through bus line 140 if the NOR gate 109 receives a start indication signal through a line 141 from the central control unit, selects a start address supplied from the address register 117 through line 131 if a start command is given from the register 116 via the line 132, and otherwise selects a combination on line 151 of the output of the selector 102 and the first address field of a microinstruction in the read register 105.

In the unit 160, the corresponding structural elements effect much the same functions as mentioned above with respect to the unit 150.

The arithmetic circuit 118 executes special processing such as decimal operations and character-string operations, while the arithmetic circuit 108 performs general processing not including the special processing. In this manner, since each of the circuits 108 and 118 performs a different and mutually exclusive type of processing, usually, one microprogram control unit keeps its associated arithmetic circuit inactive while the other microprogram control unit is making its associated arithmetic circuit perform processing under microinstructions read out of its control memory.

For instance, in a decimal operation, a start indication signal is first given from the central control unit via the line 141 to the selectors 103 and 113. In response to the start indication signal, the selectors 103 and 113 select a start address given through the lines 140 and send the start address to the memories 104 and 114, respectively. A microinstruction which is the first microinstruction included in a stream of microinstructions necessary to make the circuit 118 perform the decimal operation is read out of a location in the memory 114 specified by the start address from the selector 113. On the other hand, in the memory 104, a no operation microinstruction whose bits are all zeros is read out of a location specified by the start address. Thereafter, the arithmetic circuit 118 performs the decimal operation under the control of the stream of microinstructions read out of the memory 114 into the register 115 while the arithmetic circuit 108 is kept inactive by the no operation microinstruction in the register 105. The reading-out operation of the microinstructions following the first microinstruction from the memory 114 is well known in the art and not specifically described herein.

Now, assuming that processing by the arithmetic circuit 108 becomes necessary sometime during the decimal operation by the arithmetic circuit 118, the units 150 and 160 work as described below.

The start command and the start address included in the command field and the third address field of a microinstruction in the register 115 are stored into the registers 116 and 117, respectively, while status information is stored into the register 111 from the circuit 118. Simultaneously, the selector 113 receives the first address field of the microinstruction directly from the register 115 and the second address field of the microinstruction via the selector 112 from the register 115, and sends the memory 114 these address fields. Then, a no operation microinstruction is read out of a location in the memory 114 specified by the address fields. As a result, the unit 160 and the circuit 118 turn inactive.

On the other hand, in response to the start command from the register 116 on line 132, the selector 103 in the unit 150 sends the start address from the register 117 to the memory 104 along line 131 which then reads a microinstruction out of a location therein specified by the start address. At the same time, in response to the start command on line 132, the status information is stored into the register 101 from the register 111. In this manner, if the microinstruction in the register 105 is a conditional branch microinstruction, the address of the next microinstruction to be read out of the memory 104 is determined based on the output of the condition register 101.

Description will next be made of a second embodiment of the invention.

Figure 2:
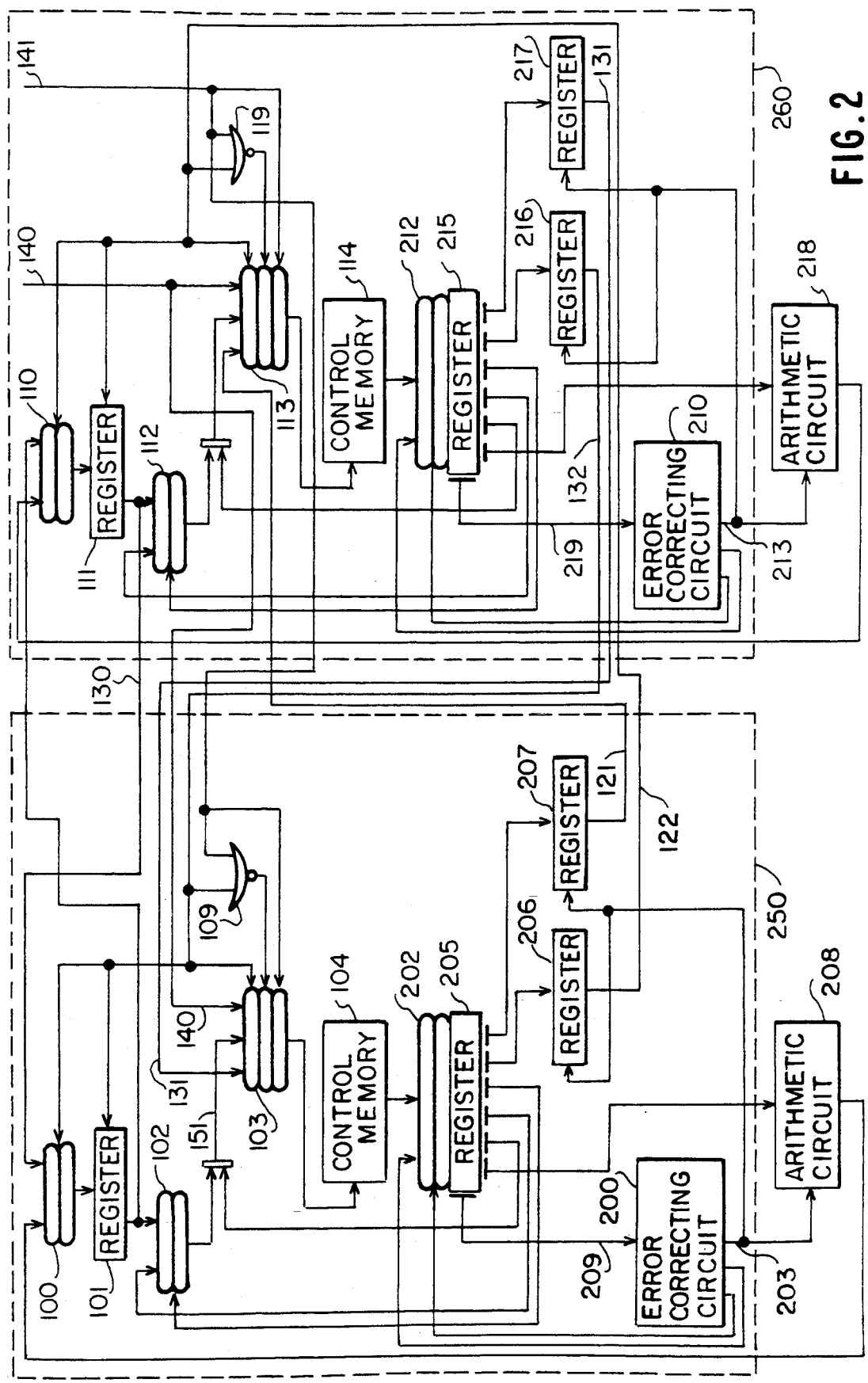
FIG. 2 is a block diagram of a second embodiment of the invention.

Referring to FIG. 2, a second embodiment of the invention comprises microprogram control units 250 and 260 with corresponding microprogram-control arithmetic circuits 208 and 218, respectively.

The control units 250 and 260 comprise error correction circuits 200 and 210, and selectors 202 and 212, in addition to the structural elements used in the first embodiment shown in FIG. 1. Read registers 205 and 215, command registers 206 and 216, address registers 207 and 217, and arithmetic circuits 208 and 218 are much the same as those in FIG. 1, except that the registers 205 and 215 are connected with the circuits 200 and 210 via a line 209 and 219, respectively, that the registers 206 and 207 and the circuit 208 are connected with the circuit 200, and that the registers 216 and 217 and the circuit 218 are connected with the circuit 210. Normally, the selector 202 and 212 select microinstructions read out of the memories 104 and 114, respectively.

Now, it is assumed that the control units 250 and 260 are active and inactive, respectively. When a microinstruction is stored into the register 205 from the memory 104 via the selector 202, the correction circuit 200 checks the microinstruction to see if it has a single-bit error. If a single-bit error is detected, the circuit 200 sends an operation-prohibition signal to the registers 206 and 207 and the circuit 208. As a result, the circuit 208 stops its operation, and the registers 206 and 207 are prohibited from storing any data. The circuit 200 corrects the single-bit error in the microinstruction according to well known hamming code techniques, and sends the corrected microinstruction and a control signal to the selector 202. In response to the control signal, the selector 202 selects the corrected microinstruction and stores it into the register 205. Thereafter, the circuit 200 stops the sending-out of the operation-prohibition signal onto the line 203.

In this manner, since the registers 206 and 207 are prohibited from storing any data when a microinstruction in the register 205 has an error, the unit 260 is prevented from mistakenly being started by such a microinstruction.

What is claimed is:

1. A microprogram control system comprising a plurality of microprogram control units, only one of which being active at a time, and a plurality of arithmetic circuits each of which controlled by a corresponding one of said microprogram control units, each microprogram control unit comprising:

a control memory holding microinstructions for controlling a corresponding arithmetic circuit, each of said microinstructions comprising a command field including a start command and an address field including a start address;

a read register for storing a microinstruction read out of said control memory;

a command register for storing a start command included in a microinstruction in said read register when it is determined that processing by a selected one of the other microprogram control units is necessary, said start command being for starting said selected one of the other microprogram control units to be activated;

a start address register for storing a start address included in a microinstruction in said read register when it is determined that processing by a selected one of the other microprogram control units is necessary, said start address being sent to said selected one of the other microprogram control units together with said start command;

a first condition register for storing status information given from said corresponding arithmetic circuit as a branch condition;

addressing means for determining a read address to next be supplied to said control memory, with reference to said status information in said first condition register, if a conditional branch microinstruction is stored in said read register, said addressing means supplying an address of a no operation microinstruction to de-activate said microprogram control unit whenever said start command and said start address are sent to said selected microprogram control unit; and start means responsive to a start command given from a command register in another microprogram control unit for storing status information given from a second condition register of said another microprogram control unit into said first condition register and for reading out a microinstruction from said control memory on the basis of a start address given from a start address register in said another microprogram control unit.

2. A microprogram control system as claimed in claim 1, wherein said start means includes a selector for selecting one of said status information from said corresponding arithmetic circuit and said status information from said second condition register in said another microprogram control unit and sending the selected one to said first condition register.

3. A microprogram control system claimed in claim 1, wherein said addressing means includes selection means for selecting an output of said status information given from said first condition register if said conditional branch microinstruction is stored in said read register and otherwise a second address field included in a microinstruction in said read register, and for combining the output of said selecting means and a first address field in said microinstruction in said read register into a read address.

4. A microprogram control system as claimed in claim 3, further comprising a selector for selecting one of said read address and said start address given from said start address register in said another microprogram control unit and sending the selected one to said control memory.

5. A microprogram control system comprising a plurality of microprogram control units only one of which being active at a time, and a plurality of arithmetic circuits each of which controlled by a corresponding one of said microprogram control units, each microprogram control unit comprising:

a control memory holding microinstructions for controlling a corresponding arithmetic circuit;

a read register for storing a microinstruction read out of said control memory;

a command register for storing a start command included in a microinstruction in said read register, said start command being for starting a first microprogram control unit to be activated;

a start address register for storing a start address included in a microinstruction in said read register, said start address designating microinstructions from said first microprogram control unit to be read upon starting said first microprogram control unit;

addressing means for determining a read address to next be supplied to said control memory, with reference to said status information in said first condition register, if a conditional branch microinstruction is stored in said read register, said addressing means supplying an address of a no operation microinstruction to de-activate said microprogram control unit whenever said start command and said start address are sent to said selected microprogram control unit;

a condition register for storing status information given from said corresponding arithmetic circuit, said status information being used as a branch condition when a conditional branch microinstruction is stored in said read register;

control transfer means responsive to a start microinstruction stored in said read register from said control memory for storing said start command and said start address included in said start microinstruction into said command register and said start address register, respectively, and for sending said start command, said start address, and said status information stored in said condition register, to said first microprogram control unit, and sending a no operation address to said control memory to deactivate said microprogram control unit after sending said start command to said first microprogram control unit, said status information being stored in a second condition register of said first microprogram control unit, said first microprogram control unit becoming active upon receiving said start command and reading microinstructions based upon said start address.

6. A microprogram control system as claimed in claim 5, wherein a microinstruction for halting said correspondingly controlled arithmetic circuit is read out of said control memory into said read register after said start microinstruction has been executed.

7. A microprogram control system as claimed in claim 5, further comprising:

error correction means for correcting said start microinstruction if said start microinstruction in said read register has an error and prohibiting said command register and start address register from storing said start command and start address included in said start microinstruction until said start microinstruction is corrected.

8. A microprogram control system comprising a plurality of microprogram control units, only one of which being active, and a plurality of arithmetic circuits each of which corresponds to one of said microprogram control units, each microprogram control unit comprising:

a control memory holding microinstructions for controlling a corresponding arithmetic circuit;

a read register for storing a microinstruction read out of said control memory;

a command register for storing a start command included in a microinstruction in said read register, said start command being for starting a first microprogram control unit;

a start address register for storing a start address included in a microinstruction in said read register, said start address being for reading out a microinstruction from said first microprogram control unit upon starting of said first microprogram control unit;

control transfer means responsive to a start microinstruction stored in said read register from said control memory for storing said start command and said start address included in said start microinstruction into said command register and said start address register, respectively, and for sending said start command, said start address and said status information, stored in said condition register, to said first microprogram control unit, and sending a no operation address to said control memory to deactivate said microprogram control unit;

starting means for selecting said status information from a second microprogram control unit when receiving a start command from said second microprogram control unit; and, error correction means for correcting said start microinstruction if said start microinstruction in said read register has an error and prohibiting said command register and start address register from storing said start command and start address included in said start microinstruction until said start microinstruction is corrected.

9. A microprogram control system comprising first and second microprogram control units and first and second arithmetic circuits corresponding to said first and second microprogram control units, respectively, only one of said first and second microprogram control units being active, said first microprogram control unit comprising:

a first control memory holding microinstructions for controlling said first arithmetic circuit;

a first read register for storing a microinstruction read out of said first control memory;

a command register for storing a start command included in said microinstruction in said first read register, said start command being for starting said second microprogram control unit;

a start address register for storing a start address included in said microinstruction in said first read register, said start address being for reading out a microinstruction from said second microprogram control unit;

a first condition register for storing status information given from said first arithmetic circuit; and a first starting means responsive to a start microinstruction stored in said first read register from said first control memory for storing said start command and said start address included in said start microinstruction into said command register and said start address register, respectively, and for sending said start command, said start address and said status information to said second microprogram control unit, and sending a no operation address to said first control memory, said start command activating said second microprogram control unit and said start address indicating the location of the microinstructions to be executed by said second microprogram control unit, said no operation address designating a no operation microinstruction to deactivate said first microprogram control unit; and said second microprogram control unit comprising:

a second control memory holding microinstructions for controlling said second arithmetic circuit;

a second read register for storing a microinstruction read out of said second control memory;

a second condition register for storing status information given from said second arithmetic circuit as a branch condition;

addressing means for determining a read address to next be supplied to said second control memory, with reference to said status information in said second condition register, if a conditional branch microinstruction is stored in said second read register; and a second starting means responsive to said start command given from said first starting means in said first microprogram control unit for storing said status information given from said first condition register of said first microprogram control unit into said second condition register and for reading out a microinstruction from said second control memory on the basis of said start address given from said start address register in said first microprogram control unit.

10. A microprogram control system as claimed in claim 9, said first microprogram control unit further comprising:

error correction means for correcting said start microinstruction if said start microinstruction in said first read register has an error and prohibiting said command register and start address register from storing said start command and start address included in said start microinstruction until said start microinstruction is corrected.

11. A microprogram control system responsive to a central control unit and comprising a plurality of microprogram control units and a plurality of arithmetic circuits each of which corresponds to one of said microprogram control units, only one of said microprogram control units being active, each of microprogram control unit receiving initial address and start indication signal from the central control unit, each microprogram control unit comprising:

control memory holding microinstructions for controlling a corresponding arithmetic circuit, each of said microinstructions comprising a command field including a start command and an address field including a start address, said control memory of only one of said microprogram control units holding a microinstruction for operation at said initial address from said central control unit while said control memory of the other microprogram control units holding a microinstruction for no operation at said initial address;

a read register for storing a microinstruction read out of said control memory;

a command register for storing a start command included in a microinstruction in said read register, when it is determined that processing by a selected one of the other microprogram control units is necessary, said start command being for starting said selected microprogram control unit to be activated;

a start address register for storing a start address included in a microinstruction in said read register, when it is determined that processing by a selected one of the other microprogram control units is necessary, said start address being sent to said selected microprogram control unit together with said start command;

a first condition register for storing status information given from said corresponding arithmetic circuit as a branch condition;

addressing means for determining a read address to next be supplied to said control memory, with reference to said status information in said first condition register, if a conditional branch microinstruction is stored in said read register, and for setting said initial address from said central control unit as said start address when said start indicating signal is sent from said central control unit, said addressing means supplying an address of a no operation microinstruction to de-activate said microprogram control unit whenever said start command and said start address are sent to said selected microprogram control unit; and start means responsive to a start command given from a command register in one of the plurality of microprogram control units for starting said microprogram control unit and storing status information given from a second condition register of said one of the plurality of the microprogram control units into said first condition register and for reading out a microinstruction from said control memory on the basis of a start address given from a start address register in said one of the plurality of the microprogram control units.

* * * * *